(12) United States Patent
Tamura et al.

(10) Patent No.: US 12,375,303 B2
(45) Date of Patent: Jul. 29, 2025

(54) AUTHENTICATION-PERMISSION SYSTEM, INFORMATION PROCESSING APPARATUS, EQUIPMENT, AUTHENTICATION-PERMISSION METHOD AND PROGRAM

(71) Applicant: NIPPON TELEGRAPH AND TELEPHONE CORPORATION, Tokyo (JP)

(72) Inventors: Sakurako Tamura, Tokyo (JP); Akira Nagai, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 273 days.

(21) Appl. No.: 17/285,455

(22) PCT Filed: Oct. 18, 2019

(86) PCT No.: PCT/JP2019/041048
§ 371 (c)(1),
(2) Date: Apr. 14, 2021

(87) PCT Pub. No.: WO2020/080510
PCT Pub. Date: Apr. 23, 2020

(65) Prior Publication Data
US 2021/0344515 A1 Nov. 4, 2021

(30) Foreign Application Priority Data
Oct. 19, 2018 (JP) .................................. 2018-197875

(51) Int. Cl.
*H04L 9/32* (2006.01)
*H04L 9/08* (2006.01)

(52) U.S. Cl.
CPC ............ *H04L 9/3273* (2013.01); *H04L 9/085* (2013.01); *H04L 9/0866* (2013.01)

(58) Field of Classification Search
CPC ...... H04L 9/3273; H04L 9/085; H04L 9/0866
See application file for complete search history.

(56) References Cited

U.S. PATENT DOCUMENTS 11,316,820 B2 *  4/2022  Ståhl ..................... H04L 61/103
11,375,369 B2 *  6/2022  Wang ..................... H04L 9/321
(Continued)

FOREIGN PATENT DOCUMENTS

JP      2009-33402 A    2/2009
JP      2010-16465 A    1/2010
(Continued)

OTHER PUBLICATIONS

Komatsu, Fumiko, NEC, "Architecture for Privacy Protection", IPSJ Magazine vol. 48, No. 7, pp. 737-743, Jul. 2017 with English Machine Translation.
(Continued)

*Primary Examiner* — William S Powers

(57) ABSTRACT

An authentication-permission system includes devices, and a server to generate a private key for each device, and to deliver an extension identifier including an identifier to identify the device and permission information on the device. The server holds the identifier and the permission information on the device; generates the private key for the device from the extension identifier that includes the identifier to identify the device and the permission information; and delivers the generated private key, and the extension identifier to the device. The device executes mutual authentication with another device, by using the extension identifier and the private key of the device, and permits the other device a request to the device, in accordance with the permission information included in the extension identifier
(Continued)

of the other device, in response to successful execution of the mutual authentication with the other device.

9 Claims, 9 Drawing Sheets

(56) References Cited

U.S. PATENT DOCUMENTS

| | | | | |
|---|---|---|---|---|
| 2005/0210249 | A1* | 9/2005 | Lee | H04L 9/3273 |
| | | | | 713/168 |
| 2006/0106836 | A1* | 5/2006 | Masugi | G06F 21/33 |
| 2010/0229241 | A1 | 9/2010 | Liu et al. | |
| 2015/0222517 | A1* | 8/2015 | McLaughlin | H04L 9/006 |
| | | | | 713/171 |
| 2016/0316367 | A1* | 10/2016 | Rose | H04B 5/77 |
| 2017/0207914 | A1 | 7/2017 | Sakemi et al. | |

FOREIGN PATENT DOCUMENTS

| | | | |
|---|---|---|---|
| JP | 2010016465 | * | 1/2010 |
| JP | 2010016465 A | * | 1/2010 |
| JP | 2017-126970 A | | 7/2017 |

OTHER PUBLICATIONS

A. Kato, M. Scott, T. Kobayashi and Y. Kawahara, "Optimal Ate Pairing draft-kato-optimal-ate-pairings-00", Network Working Group Internet-Draft, p. 1-17, Jul. 6, 2015.

* cited by examiner

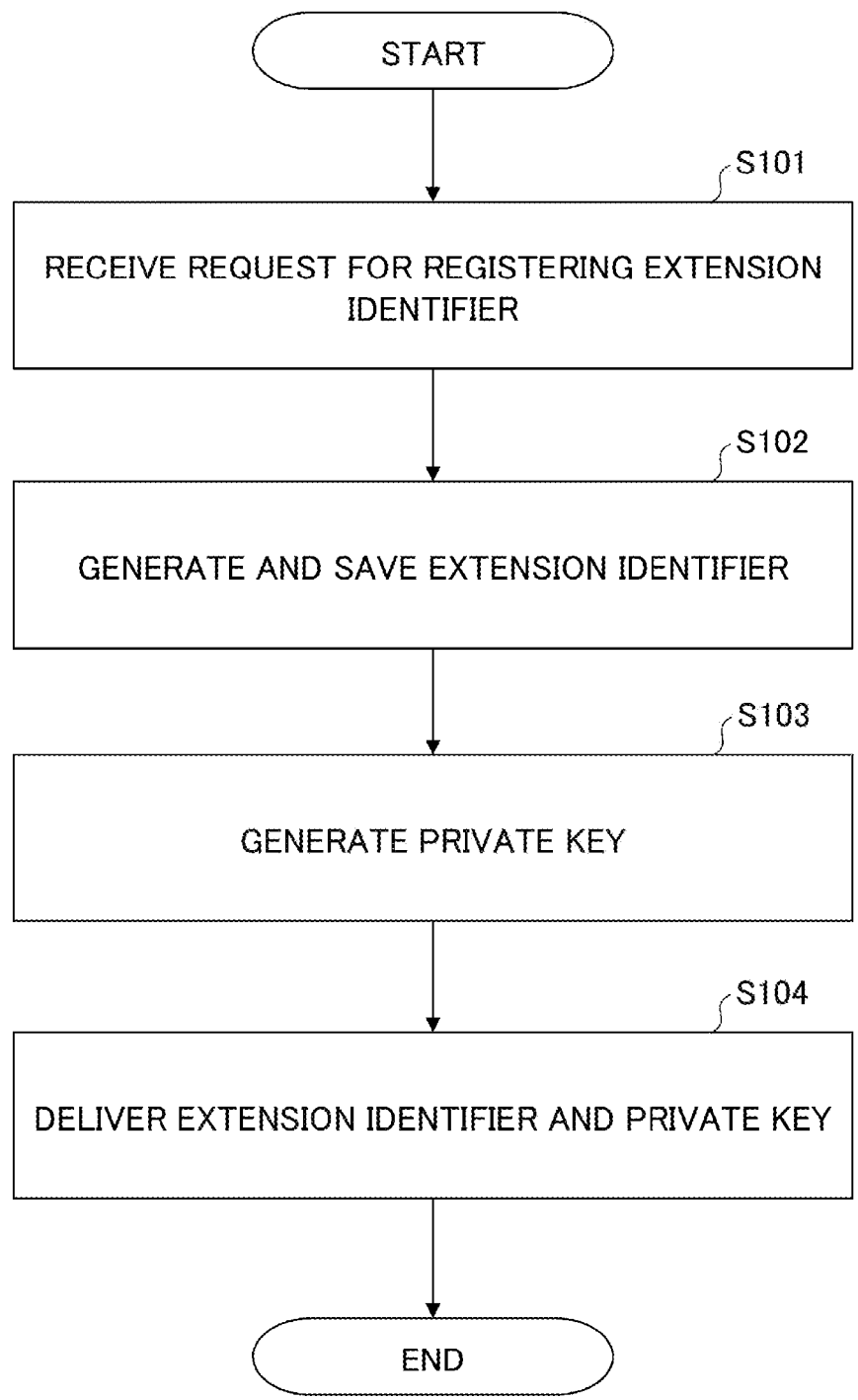

FIG.6A

EXTENSION IDENTIFIER OF PERMITTED DEVICE

| IDENTIFIER OF PERMITTED DEVICE | DATE | IDENTIFIER OF PERMITTING DEVICE |
|---|---|---|

PERMISSION INFORMATION (covers DATE and IDENTIFIER OF PERMITTING DEVICE)

FIG.6B

EXTENSION IDENTIFIER OF PERMITTED DEVICE

| IDENTIFIER OF PERMITTED DEVICE | DATE | IDENTIFIER OF PERMITTING DEVICE | PERMITTED OPERATION |
|---|---|---|---|

PERMISSION INFORMATION (covers DATE, IDENTIFIER OF PERMITTING DEVICE, and PERMITTED OPERATION)

FIG.6C

EXTENSION IDENTIFIER OF PERMITTING DEVICE

| IDENTIFIER OF PERMITTING DEVICE | DATE |
|---|---|

AUTHENTICATION-PERMISSION SYSTEM, INFORMATION PROCESSING APPARATUS, EQUIPMENT, AUTHENTICATION-PERMISSION METHOD AND PROGRAM

CROSS-REFERENCE TO RELATED APPLICATIONS

This application is a U.S. 371 Applications of International Patent Application No. PCT/JP2019/041048, filed on 18 Oct. 2019, which application claims priority to and the benefit of JP Application No. 2018-197875, filed on 19 Oct. 2018, the disclosures of which are hereby incorporated herein by reference in their entireties.

TECHNICAL FIELD

The present invention relates to an authentication-permission system, an information processing apparatus, equipment (a device), an authentication-permission method, and a program.

BACKGROUND ART

In recent years, in the case where IoT (Internet of Things) devices communicate with each other, or an IoT device communicates with a gateway device or a server device on the cloud, authentication to verify the validity with each other, and permission granting to permit another device to access data, a function, or the like held on an IoT device have become important. Normally, authentication and permission granting are executed independently, and in general, authentication is first executed for verifying the validity with each other, and then, accessible data, functions, and the like as permission information are verified. For example, in the case of operating a household appliance via a smartphone, authentication is first executed between the smartphone and the household appliance to verify the validity with each other, and after the validity has been verified with each other, operational permission is granted to the smartphone by the household appliance. Accordingly, the user of the smartphone becomes capable of operating the household appliance.

In this way, in the field of IoT, although authentication and permission granting are executed independently, basically, it is common to execute both authentication and permission granting (hereafter, authentication and permission granting are collectively referred to as "authentication-permission").

Here, as authentication protocols for IoT devices, for example, passwords; digital certificates using PKI (Public Key Infrastructure); authenticated key sharing protocols using ID-based cryptography; and the like have been known. In the case of using passwords as the authentication protocol, the password needs to be set for each IoT device; also, as it is favorable to change the password regularly, in the case where the number of IoT devices is enormous, the operation may become difficult. Therefore, as the authentication protocol for IoT devices, it is often the case that digital certificates using PKI and authenticated key sharing protocols using ID-based cryptography are used. Note that a key sharing protocol is also called a key exchange protocol.

Meanwhile, ID-based cryptography is public key cryptography in which an identifier such as an ID expressed by any character string can be used as a public key. In the case of using the ID-based cryptography for an IoT device, for example, the manufacturing number, manufacturing code, serial number, or the like of the IoT device can be used as the public key. Using this feature makes authenticated key sharing possible.

In general, an authenticated key sharing protocol is a protocol in which devices (e.g., IoT devices, server devices, and the like) that need to share keys for encrypted communication execute an authentication process with each other, to generate a shared key if the authentication succeeds. As the authenticated key sharing protocols, for example, M-Pin Full as an authenticated key sharing protocol using Pin (Personal Identification Number) inputs; FSU (Fujioka-Suzuki-Ustaoglu) and Chen-Cheng-Smart as pairing-based authenticated key sharing protocols; and the like have been known. In the authenticated key sharing protocol, a master private key is held in a key generation center (hereafter also referred to as "KGC"), and authentication is executed by generating a private key of each device from the master private key.

On the other hand, as permission granting protocols, the OAUTH2 protocol and the like have been known. In the OAUTH2 protocol, a device obtains an access token from a permission granting server, and presents the access token to a device to be accessed, and thereby, becomes capable of using data, a function, or the like held in the device to be accessed. At this time, the validity of the device is verified by some authentication, and after the validity has been verified, an access token is issued. Other than this, as a method of implementing permission granting within the PKI framework, there is also a method in which an access token is written in an electronic certificate, and the electronic certificate is used as an access token (hereafter, an electronic certificate having an access token written will be referred to as a "permission certificate"). In the case of using an electronic certificate using PKI (Public Key Infrastructure) as the authentication protocol for IoT devices, by using this method, authentication-permission can be executed only with PKI.

As described above, in the case where devices execute authentication-permission with each other, first, it is implemented such that the validity is verified with each other by executing some authentication, and then, in response to issuance of an access token or permission certificate, an accessing device presents the access token or permission certificate to the accessed device. Therefore, authentication-permission can be implemented by various combinations of authentication protocols and permission granting protocols.

RELATED ART DOCUMENTS

Non-Patent Documents

[Non-Patent Document 1] Komatsu, Fumiko, NEC, "Architecture for Privacy Protection", IPSJ Magazine Vol. 48, No. 7, pp. 737-743, July 2017

SUMMARY OF INVENTION

Problem to be Solved by the Invention

Here, due to constraints on power consumption and the like, it is often the case a narrow bandwidth wireless network is used for IoT devices, and there may be cases where communication speed is slow and/or communication is unstable. Therefore, in the case of executing authentication-permission on IoT devices, it is desirable to have a light communication load (i.e., communication traffic, the number of communications, and the like).

The present invention has been made in view of the above points, and has an object to reduce the communication load associated with authentication-permission.

Means for Solving the Problem

In order to achieve the above object, according to an embodiment of the present invention, an authentication-permission system includes a plurality of devices; and a server configured to generate a private key for each device among the plurality of devices, and to deliver an extension identifier that includes an identifier to identify said each device and permission information on said each device. The server includes a holding unit configured to hold the identifier of said each device and the permission information on said each device, a generation unit configured to generate the private key for said each device from the extension identifier that includes the identifier to identify said each device and the permission information on said each device, and a delivering unit configured to deliver the private key generated by the generation unit, and the extension identifier to said each device. Said each device among the plurality of devices includes an authentication unit configured to execute mutual authentication with another device, by using the extension identifier and the private key of said each device, and a permission granting unit configured to permit said another device a request to said each device, in accordance with the permission information included in the extension identifier of said another device, in response to the mutual authentication with said another device successfully executed by the authentication unit.

Advantage of the Invention

The communication load associated with authentication-permission can be reduced.

BRIEF DESCRIPTION OF DRAWINGS

FIG. 5 is a diagram illustrating an example of a registration process of an extension identifier in the embodiment according to the present invention;

FIG. 6A illustrates an example of a configuration of an extension identifier;

FIG. 6B illustrates an example of a configuration of an extension identifier;

FIG. 6C illustrates an example of a configuration of an extension identifier;

EMBODIMENTS OF THE INVENTION

In the following, an embodiment according to the present invention will be described. In the embodiment according to the present invention, an authentication-permission system 1 will be described in which, in the case of executing authentication based on an authentication protocol using ID-based cryptography, authentication and permission granting are executed within the same processing (in other words, a permission granting process is also executed in the authentication process) so that the communication load (communication traffic, the number of communications, and the like) associated with the authentication-permission can be reduced.

Here, in the embodiment according to the present invention, as the identifier in the authentication protocol using ID-based cryptography (hereafter, this identifier will be referred to as the "extension identifier"), by using an identifier that includes information used in the permission granting (e.g., permission information and the like), authentication-permission are implemented within the same processing. Therefore, unlike conventional KGC, KGC in the embodiment according to the present invention (hereafter, also referred to as "AuthID-KGC" (Authentication-permission ID & Key Generation Center) includes a unit to manage information used in the permission granting and to generate an extension identifier, and a unit to deliver an extension identifier in addition to a private key.

In other words, for example, in the case of executing the authentication-permission on a device A and a device B, each of the device A and the device B verifies the validity with each other by using a private key corresponding to its own extension identifier. Then, if the validity is verified with each other, each of the device A and the device B refers to the permission information and the like included in the extension identifier of the counterpart to verify whether the counterpart has been granted for permission. Here, a private key corresponding to the extension identifier is generated on the AuthID-KGC and delivered in advance to each device. Therefore, in the embodiment according to the present invention, it can be stated that by generating and delivering the private key using the extension identifier, the AuthID-KGC grants the permission to the device corresponding to the extension identifier.

In this way, in the embodiment according to the present invention, after the mutual authentication based on the authentication protocol using ID-based cryptography, the permission of the counterpart can be verified by simply referring to the extension identifier of the counterpart. Therefore, the devices can reduce the communication load for the permission granting (e.g., the load generated in communication with a permission granting server, and the like).

<Overall Configuration>

Figure 1:
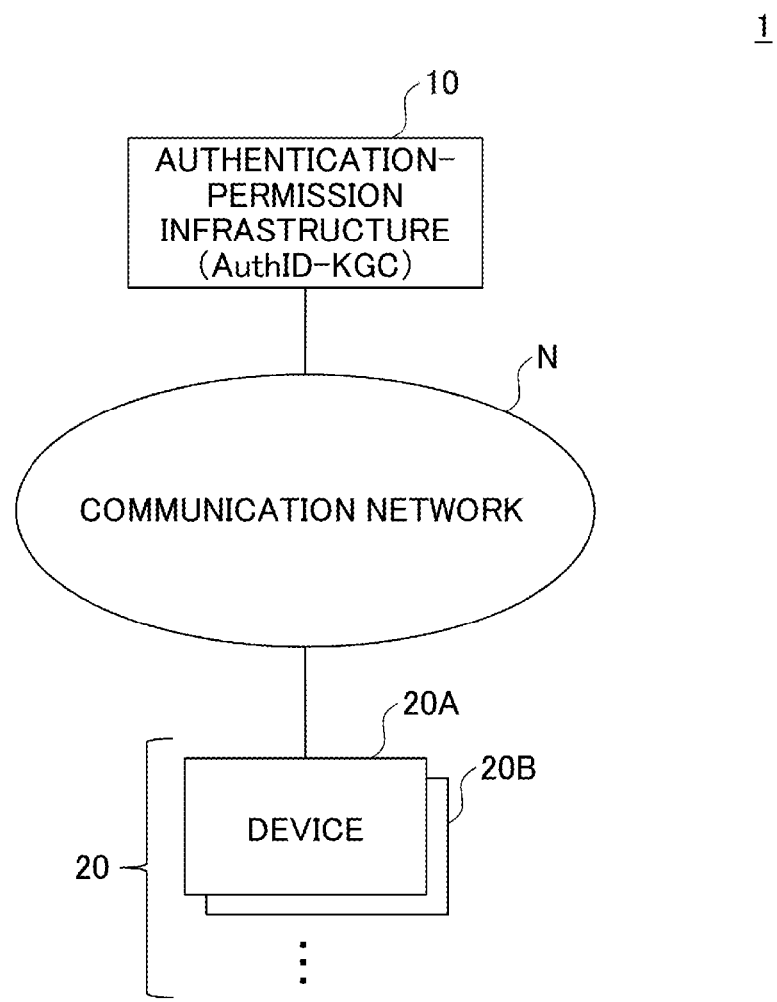
FIG. 1 is a diagram illustrating an example of an overall configuration of an authentication-permission system in an embodiment according to the present invention.

First, an overall configuration of the authentication-permission system 1 in the embodiment according to the present invention will be described with reference to FIG. 1. FIG. 1 is a diagram illustrating an example of an overall configuration of an authentication-permission system 1 in the embodiment according to the present invention.

As illustrated in FIG. 1, the authentication-permission system 1 in the embodiment according to the present invention includes an authentication-permission infrastructure 10 and one or more devices 20. Also, the authentication-permission infrastructure 10 and the devices 20 are communicably connected via a communication network N such as the Internet.

The authentication-permission infrastructure 10 is a computer or computer system that functions as an AuthID-KGC. For example, in response to a request (a request for registering an extension identifier) from the administrator of a device 20 (hereafter, also referred to as the "device administrator"), the authentication-permission infrastructure 10 registers the extension identifier in the authentication-permission infrastructure 10, generates a private key from the extension identifier, and delivers the private key to the device 20 corresponding to the extension identifier. Note that for example, the device administrator may make the request for registering the extension identifier by using a terminal connected to the authentication-permission infrastructure 10 via the communication network N, or may make the request for registering the extension identifier by operating the authentication-permission infrastructure 10.

The devices 20 are, for example, various types of IoT devices including various sensor devices, embedded devices, wearable devices, digital household appliances, monitoring camera devices, lighting devices, medical devices, industrial devices, and the like. The device 20 executes authentication (i.e., verification of the validity) with the other device 20 based on an authentication protocol using ID-based cryptography, to execute authentication-permission. At this time, the device 20 executes the authentication with other devices 20, by using a private key delivered from the authentication-permission infrastructure 10.

In the following, in the case of distinguishing the multiple devices 20, the devices will be referred to as the "device 20A", "device 20B", and so on. Also, in the case where a device 20 operates (also including "accesses") or uses data, a function, or the like of another device 20, the other device 20 verifies the permission of the device 20; therefore, in the following, the device 20 (i.e., the device 20 that is on the side to operate data or to use a function) will be also referred to as a "permission-granted device 20", and the other device 20 (i.e., the device 20 that executes permission granting for the permission-granted device 20, and is on the side to allow the counterpart to operate the data and to use the function) will be also referred to as a "permission-granting device 20". Note that, for example, two devices 20 may mutually operate or use data, a function, or the like, there may be a case where one device 20 operates as a permission-granted device 20 and as a permission-granting device 20.

Note that although the device 20 in the embodiment according to the present invention will be described as an IoT device or the like having limited hardware resources (e.g., in terms of the processor performance, memory capacity, and the like) compared to a typical PC (personal computer), the device 20 may be a device other than an IoT device. For example, the device 20 may be a smartphone, a tablet terminal, or the like.

Note that the configuration of the authentication-permission system 1 illustrated in FIG. 1 is an example, and a different configuration may be adopted. For example, a terminal used by the device administrator described above may be included in the authentication-permission system 1. Also, in the case where the device 20 executes authentication-permission with some device or apparatus other than the device 20 (e.g., a gateway device, a server, or the like), the device or apparatus may be included in the authentication-permission system 1.

<Hardware Configuration>

Next, a hardware configuration of the authentication-permission infrastructure 10 and the device 20 in the embodiment according to the present invention will be described.

<<Authentication-Permission Infrastructure 10>>

Figure 2:
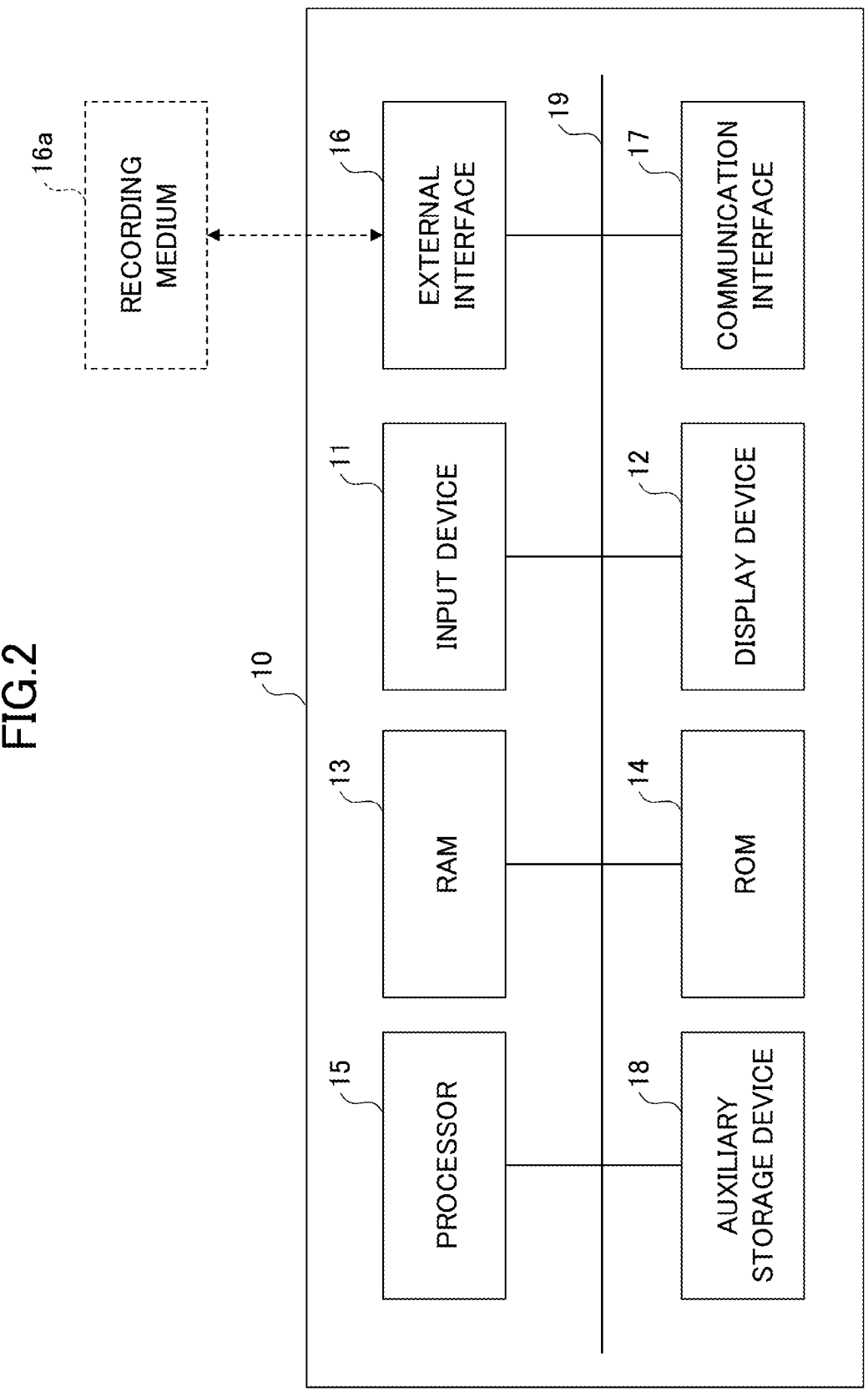
FIG. 2 is a diagram illustrating an example of a hardware configuration of an authentication-permission infrastructure in the embodiment according to the present invention.

In the following, the hardware configuration of the authentication-permission infrastructure 10 in the embodiment according to the present invention will be described with reference to FIG. 2. FIG. 2 is a diagram illustrating an example of a hardware configuration of an authentication-permission infrastructure 10 in the embodiment according to the present invention.

As illustrated in FIG. 2, the authentication-permission infrastructure 10 in the embodiment according to the present invention includes an input device 11, a display device 12, a RAM (Random Access Memory) 13, a ROM (Read-Only Memory) 14, a processor 15, an external I/F 16, a communication I/F 17, and an auxiliary storage device 18. These hardware components are communicably connected via a bus 19.

The input device 11 is, for example, a keyboard, a mouse, a touch panel, or the like, and used by the user for inputting various operations. The display device 12 is, for example, a display or the like, and is used for displaying various processing results and the like for the user. Note that the authentication-permission infrastructure 10 may not include at least one of the input device 11 and the display device 12.

The RAM 13 is a volatile semiconductor memory to temporarily hold programs and data. The ROM 14 is a non-volatile semiconductor memory that can hold programs and data even when the power is turned off. The processor 15 is, for example, a CPU (central processing unit) or a GPU (Graphics Processing Unit), and is an arithmetic/logic device to read programs and data from the ROM 14 or the auxiliary storage device 18 onto the RAM 13 and to execute processing. Note that the authentication-permission infrastructure 10 may include both a CPU and a GPU as the processors 15, or it may include only one of the CPU and the GPU.

The external I/F 16 is an interface with an external device. The external device includes a recording medium 16a or the like. As the recording medium 16a, a CD (Compact Disc), a DVD (Digital Versatile Disk), an SD memory card (Secure Digital Memory Card), a USB (Universal Serial Bus) memory card, or the like may be enumerated. The recording medium 16a may record one or more programs that implement functions of the authentication-permission infrastructure 10.

The communication I/F 17 is an interface for connecting the authentication-permission infrastructure 10 to the communication network N. The authentication-permission infrastructure 10 can execute data communication with the device 20 via the communication I/F 17.

The auxiliary storage device 18 is a non-volatile storage device such as an HDD (hard disk drive), an SSD (solid state drive), or the like. The auxiliary storage device 18 stores one or more programs that implement the functions of the authentication-permission infrastructure 10.

By having the hardware configuration illustrated in FIG. 2, the authentication-permission infrastructure 10 in the embodiment according to the present invention can implement various types of processing as will be described later. Note that although FIG. 2 illustrates the case where the authentication-permission infrastructure 10 in the embodiment according to the present invention is implemented by a single information processing apparatus (computer), it is not limited as such. The authentication-permission infrastructure 10 in the embodiment according to the present invention may be implemented by multiple information processing apparatuses (computers).

<<Device 20>>

Figure 3:
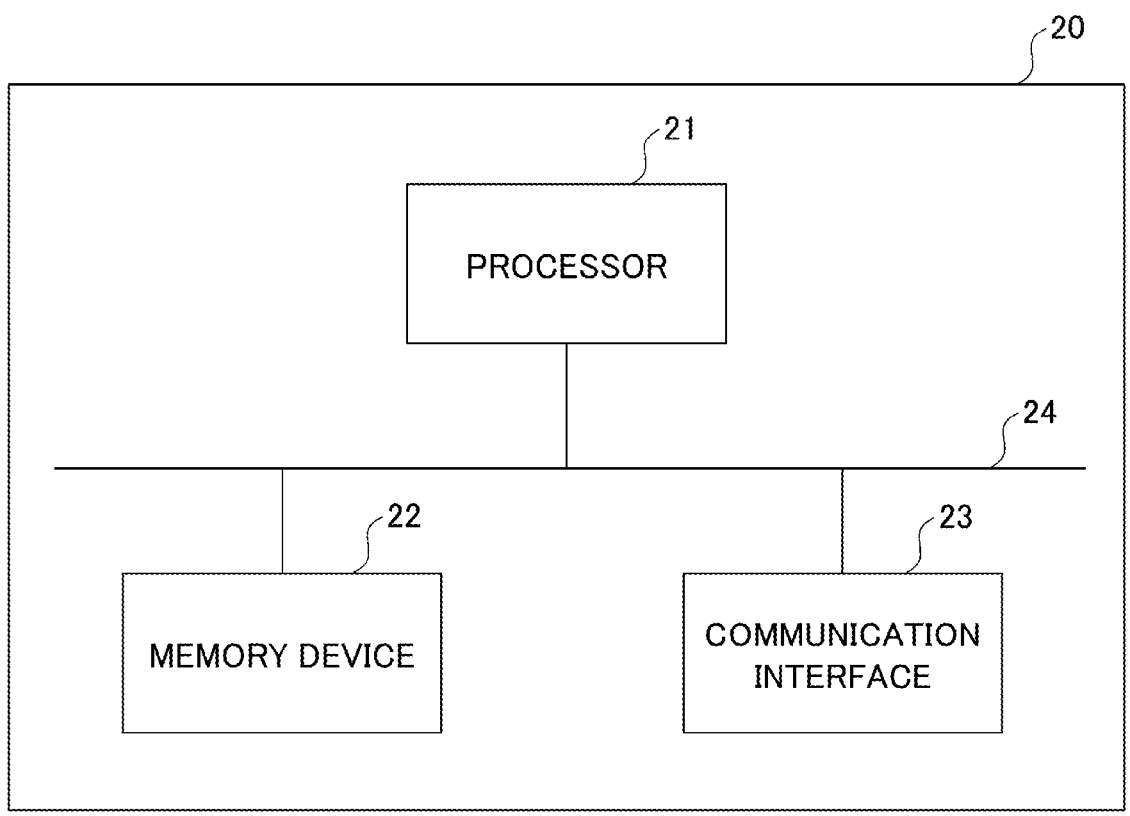
FIG. 3 is a diagram illustrating an example of a hardware configuration of a device in the embodiment according to the present invention.

In the following, the hardware configuration of the device 20 in the embodiment according to the present invention will be described with reference to FIG. 3. FIG. 3 is a diagram illustrating an example of a hardware configuration of the device 20 in the embodiment according to the present invention.

As illustrated in FIG. 3, the device 20 in the embodiment according to the present invention includes a processor 21, a memory device 22, and a communication I/F 23. These hardware components are communicably connected via a bus 24.

The processor 21 is, for example, an MPU (Micro Processing Unit), a CPU, or the like, and is an arithmetic/logic device that reads programs and data from the memory device 22, and executes processing.

The memory device 22 is, for example, a RAM, a ROM, a flash memory, or the like, to store various items of data and programs. The memory device 22 stores one or more programs that implement the functions of the device 20 in the embodiment according to the present invention.

The communication I/F 23 is an interface for connecting the device 20 to the communication network N. The device 20 can execute data communication with the other devices 20, the authentication-permission infrastructure 10, and the like via the communication I/F 23.

By having the hardware configuration illustrated in FIG. 3, the device 20 in the embodiment according to the present invention can implement various types of processing as will be described later.

<Functional Configuration>

Figure 4:
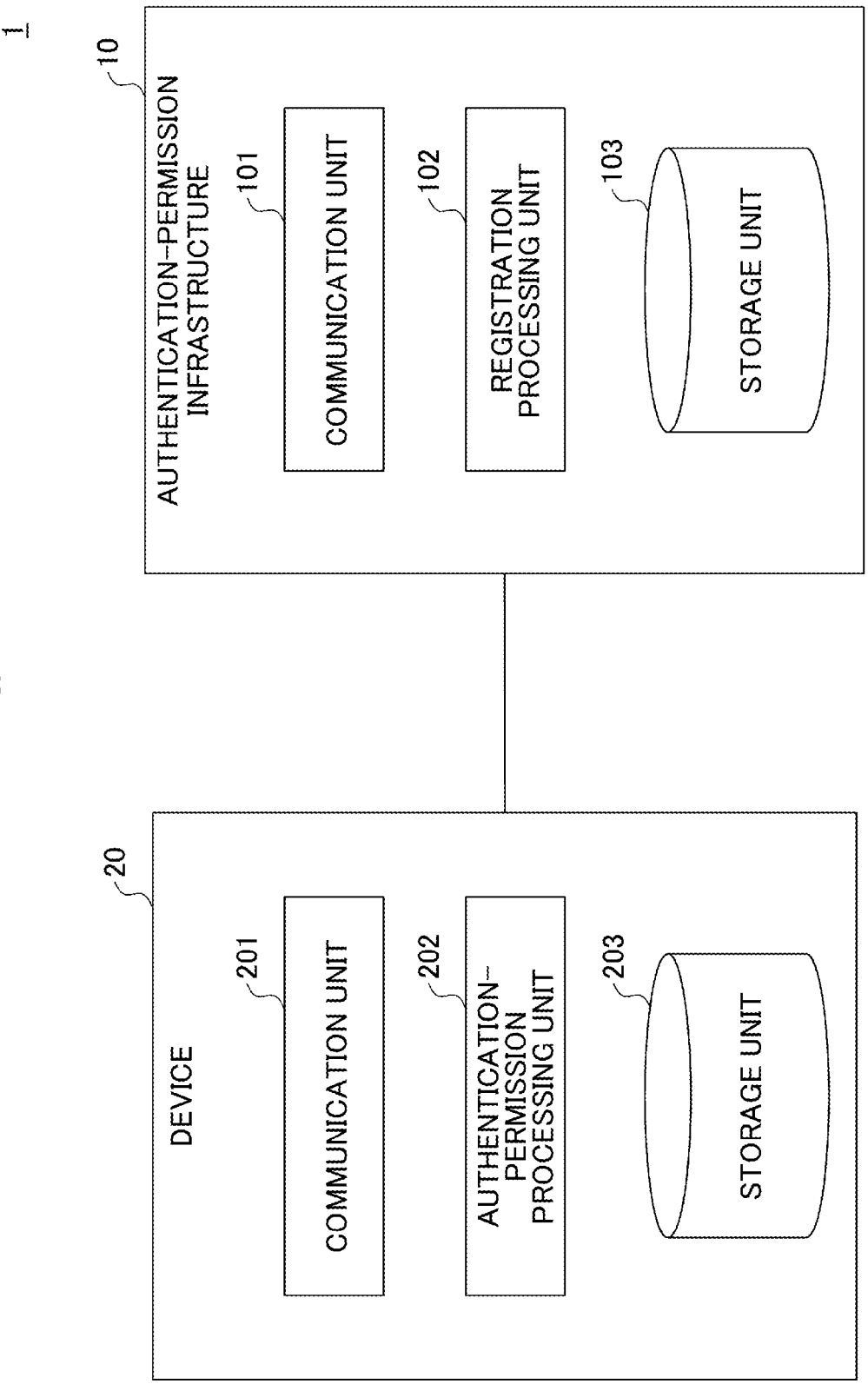
FIG. 4 is a diagram illustrating an example of a functional configuration of an authentication-permission system in the embodiment according to the present invention.

Next, a functional configuration of the authentication-permission system 1 in the embodiment according to the present invention will be described with reference to FIG. 4. FIG. 4 is a diagram illustrating an example of a functional configuration of an authentication-permission system 1 in the embodiment according to the present invention.

<<Authentication-Permission Infrastructure 10>>

As illustrated in FIG. 4, the authentication-permission infrastructure 10 in the embodiment according to the present invention includes a communication unit 101 and an registration processing unit 102. These functional units are implemented by one or more programs installed in the authentication-permission infrastructure 10 that causes the processor 15 to execute processing.

Also, the authentication-permission infrastructure 10 in the embodiment according to the present invention includes a storage unit 103. The storage unit 103 can be implemented by using, for example, the auxiliary storage device 18 or the like. Note that the storage unit 103 may be implemented by using a storage device or the like connected to the authentication-permission infrastructure 10 via the communication network N.

The communication unit 101 executes various communications with the device 20 or other devices (e.g., a terminal used by the device administrator and the like). For example, in response to a request from a device administrator (a request for registering an extension identifier), the registration processing unit 102 registers the extension identifier in the authentication-permission infrastructure 10, and generates and delivers a private key, Here, as will be described later, the extension identifier represents information that includes the identifier of the device 20 and information used in the permission granting (e.g., permission information and the like). Also, the identifier of the device 20 is information to identify the device 20, such as the manufacturing number, manufacturing code, serial number, or the like of the device 20. Other than these, a telephone number, a mail address, or the like may be used as the identifier of the device 20. Also, as the identifier of the device 20, information that combines the manufacturing number, manufacturing code, serial number, telephone number, mail address, and the like may be used.

The storage unit 103 stores the extension identifier registered by the registration processing unit 102. Note that in addition to the extension identifier, the storage unit 103 may store, for example, a private key corresponding to the extension identifier or the like.

<<Device 20>>

As illustrated in FIG. 4, the device 20 in the embodiment according to the present invention includes a communication unit 201 and an authentication-permission processing unit 202. These functional units are implemented by one or more programs installed in the device 20 that causes the processor 21 to execute processing.

Also, the device 20 in the embodiment according to the present invention includes a storage unit 203. The storage unit 203 can be implemented by using, for example, a memory device 22 or the like.

The communication unit 201 executes various communications with the other devices 20, the authentication-permission infrastructure 10, other apparatuses, and the like. The authentication-permission processing unit 202 executes authentication with the other device 20 by using its own extension identifier, private key, and the like, and verifies the permission granted to the counterpart with reference to the extension identifier of the counterpart.

The storage unit 203 stores its own private key, extension identifier, and the like delivered from the authentication-permission infrastructure 10. Also, the storage unit 203 also stores the extension identifier of a device 20 as the counterpart of the mutual authentication and various information items required for the mutual authentication.

<Details of Processing>

Next, processing executed by the authentication-permission system 1 in the embodiment according to the present invention will be described in detail.

<<Process of Registering an Extension Identifier>>

In the following, a process of registering an extension identifier in the authentication-permission infrastructure 10 (the registration process of an extension identifier) will be described with reference to FIG. 5. FIG. 5 is a diagram illustrating an example of a registration process of an extension identifier in the embodiment according to the present invention.

First, at Step S101, the registration processing unit 102 receives a request for registering an extension identifier from, for example, the device administrator. As described above, for example, the device administrator may make the request for registering the extension identifier by using a terminal connected to the authentication-permission infrastructure 10 via the communication network N, or may make the request for registering the extension identifier by operating the authentication-permission infrastructure 10.

Here, in the case of making a request for registering the extension identifier of the permission-granted device 20, the device administrator specifies the identifier of the permission-granted device 20 and the permission information. The permission information includes the identifier of the permission-granting device 20 and operational permission with respect to the permission-granting device 20 (i.e., operational permission to be granted to the permission-granted device 20). Further, in the case of setting an expiration date in the permission information, the device administrator may specify a date (or date and time) that indicates the expiration date.

On the other hand, in the case of making a request for registering the extension identifier of the permission-granting device 20, the device administrator specifies the identifier of the permission-granting device 20.

In this way, the device administrator specifies at least the identifier of the device 20, to make a request for registering the extension identifier. Note that there may be a case where a certain device 20 operates as a permission-granted device 20, and at the same time, operates as a permission-granting device 20. In this case, the permission information or the like is specified in the request for registering the extension identifier of the certain device 20.

Next, at Step S102, based on the request for registering the extension identifier received at Step S101 described above, and stores the extension identifier in the storage unit 103, the registration processing unit 102 generates an extension identifier, and stores the extension identifier in the storage unit 103.

Here, examples of configurations of the extension identifier will be described with reference to FIG. 6. FIG. 6 includes diagrams illustrating examples of configurations of the extension identifier.

FIG. 6A is an extension identifier of a permission-granted device 20, and constituted with the identifier of the permission-granted device 20, a date, and permission information. Also, the permission information includes the identifier of a permission-granting device 20. This extension identifier indicates that access from the permission-granted device 20 to the permission-granting device 20 is permitted (granted), in the case where the mutual authentication between the permission-granted device 20 and the permission-granting device 20 is successful. Note that the date may be the expiration date of the permission information, may be the date of generation of the extension identifier, may be the expiration date of the extension identifier itself, or may be a combination of these.

The extension identifier in FIG. 6A can be expressed as "#A_YYYYMMDD_#B", for example, in the case where the identifier of the permission-granted device 20 is expressed as "#A", the date is expressed as "YYYYMMDD", and the identifier of the permission-granting device 20 is expressed as "#B".

FIG. 6B is the extension identifier of a permission-granted device 20, and constituted with the identifier of the permission-granted device 20, a date, and permission information. Also, the permission information includes the identifier of the permission-granting device 20 and a permitted operation on the permission-granting device 20. This extension identifier indicates that an operation specified in the permitted operation (e.g., operation of data, use of a function, or the like) is permitted (granted) by the permission-granting device 20 for the permission-granted device 20, in the case where the mutual authentication between the permission-granted device 20 and the permission-granting device 20 is successful. Note that as described above, the date may be the expiration date of the permission information, may be the date of generation of the extension identifier, may be the expiration date of the extension identifier itself, or may be a combination of these.

The extension identifier in FIG. 6B can be expressed as "#A_YYYYMMDD_#B_#OPEN", for example, in the case where the identifier of the permission-granted device 20 is expressed as "#A", the date is expressed as "YYYYMMDD", and the identifier of the permission-granting device 20 is expressed as "#B", and a permitted operation is "#OPEN" (e.g., file reference)

FIG. 6C is the extension identifier of a permission-granting device 20, and constituted with the identifier of the permission-granting device 20 and a date. Note that the date may be the date of generation of the extension identifier, may be the expiration date of the extension identifier itself, or may be a combination of these.

The extension identifier in FIG. 6C can be expressed as, for example, "#B_YYYYMMDD" in the case where the identifier of the permission-granting device 20 is expressed as "#B", and the date is expressed as "YYYYMMDD".

In this way, in the extension identifier of a permission-granted device 20 (e.g., FIG. 6A or 6B), the identifier of the permission-granted device 20 is associated with the permission information on the permission-granted device 20. Accordingly, with reference to the permission information, the permission-granting device 20 can grant an operation of data and/or use of a function to the permission-granted device 20. Note that in FIG. 6B described above, as an example, although the case where the permission information of the extension identifier includes a permitted operation is illustrated, other than this, the permission information may also include various items of information. For example, a prohibited operation may be included in the case where it is desired to explicitly specify an operation or function prohibited for the permission-granted device 20. Also, for example, the permission information may include expiration information representing whether the permission information is expired.

Next, at Step S103, the registration processing unit 102 generates a private key from the extension identifier generated at Step S102 described above.

Finally, at Step S104, the registration processing unit 102 delivers to the device 20 the extension identifier of the device 20 and the private key generated from the extension identifier. At this time, the extension identifier may be delivered (or made public) to all devices 20, or the extension identifier may be treated so that the extension identifier of the permission-granted device 20 is delivered (or made public) to the permission-granting device 20.

Accordingly, the storage unit 203 of the device 20 stores the extension identifier and the private key delivered from the authentication-permission infrastructure 10. Note that as the method of delivering an extension identifier and a private key from the authentication-permission infrastructure 10 to the device 20, for example, these may be delivered by the communication unit 101 via the communication network N, or may be delivered via an external recording medium or the like.

As described above, the extension identifier including the identifier of the device 20 is registered in the authentication-permission infrastructure 10, and the extension identifier and the private key generated from the extension identifier are delivered to the device 20.

<<Authentication-Permission Process>>

Figure 7:
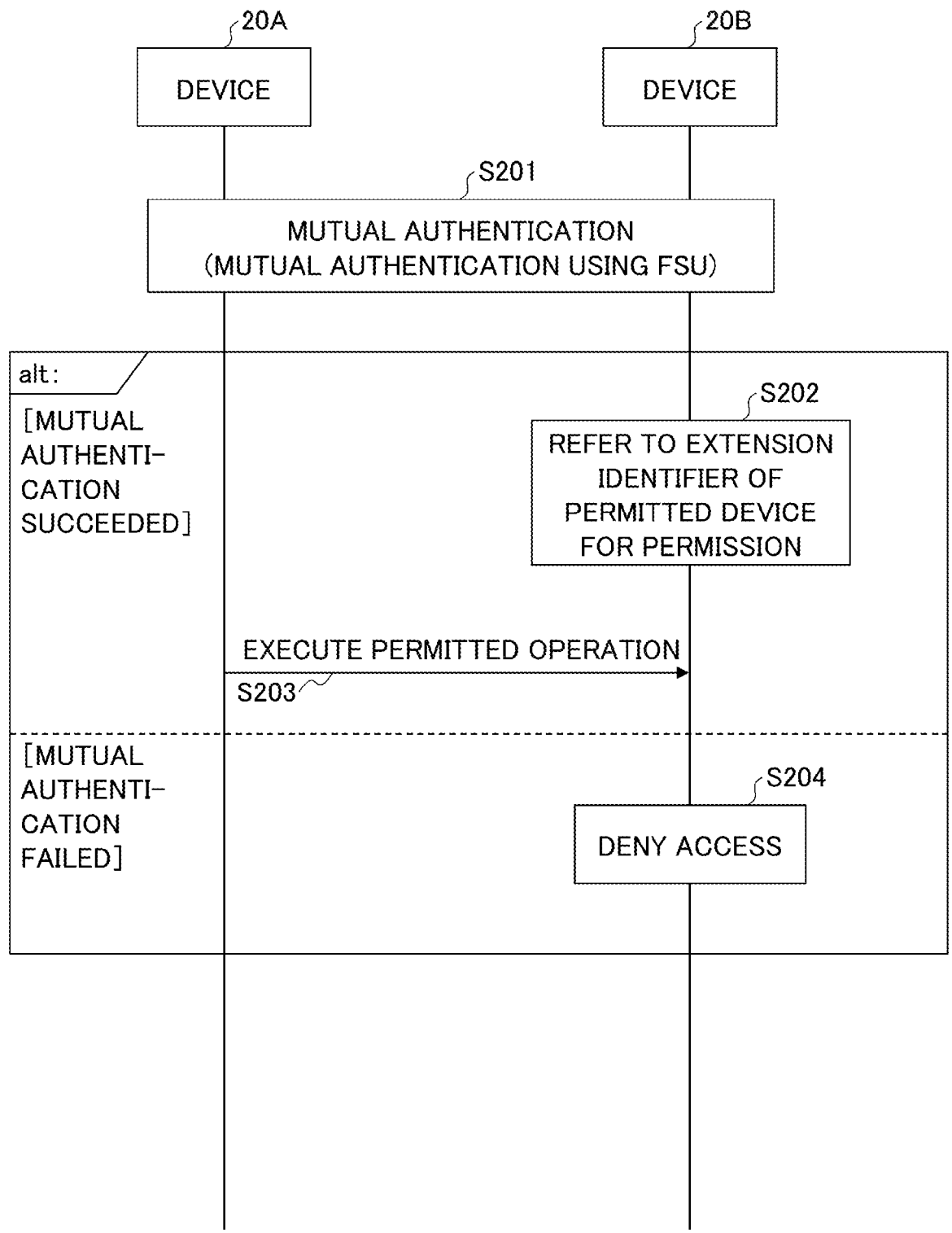
FIG. 7 is a flow chart illustrating an example of an authentication-permission process in the embodiment according to the present invention.

In the following, a process executed between the devices 20 for authentication and permission granting (an authentication-permission process) will be described with reference to FIG. 7. FIG. 7 is a flow chart illustrating an example of an authentication-permission process in the embodiment according to the present invention.

In the authentication-permission process illustrated in FIG. 7, as an example, a case will be described in which the authentication-permission process is executed between the device 20A and the device 20B, where the permission-granted device 20 corresponds to the "device 20A" and the permission-granting device 20 corresponds to the "device 20B". Also, as an example, it is assumed to use FSU as an authenticated key sharing protocol using ID-based cryptography, to execute mutual authentication between the device 20A and the device 20B.

Definition of Symbols

The symbols used later are defined as follows.
$ID_A$: the extension identifier of the device 20A
$ID_B$: the extension identifier of the device 20B
$D_{A,1}$: the private key of the device 20A
$D_{13,2}$: the private key of the device 20B
k: a security parameter
p, q: prime numbers satisfying p≠q
$G_1$: a subgroup in an elliptic curve $E_1:=E(F_p)$ on a finite field $F_p$
$G_2$: a subgroup in the following elliptic curve on the k-th extension field of $F_p$ $$E_2:=E(F_p{}^k) \quad \text{[Formula 1]}$$

$g_1$: a generator of $G_1$
$g_2$: a generator of $G_2$
$Z_q$: cosets modulo q
$Z \in Z_q$: a master private key
$Z_v=zg_v \in G_v (v=1, 2)$: a master public key
$H_1$: a function to generate elements on $G_1$ from a string (i.e., an octet string)
$H_2$: a function to generate elements on $G_2$ from a string
H: a key derivation function
E: Optimal Ate paring on a BN (Barreto-Naehrig) curve
Note that as for the Optimal Ate paring on a BN curve, see, for example, the following reference 1.

REFERENCE 1

K. Kasamatsu, S. Kanno, T. Kobayashi and Y. Kawahara: Optimal Ate Pairing draft-kasamatsu-optimal-ate-pairings-00. Network Working Group Internet-Draft: to appear Here, among the symbols defined above, all but the master private key z, the private key $D_{A,1}$ and $D_{B,2}$ are public information.

First, at Step S201, mutual authentication (mutual authentication using FSU) is executed between the device 20A and the device 20B. Details of the processing executed in the mutual authentication using FSU will be described later.

If the mutual authentication at Step S201 described above is successful (i.e., if the validity is mutually verified between the device 20A and the device 20B), at Step S202, the authentication-permission processing unit 202 of the device 20B grants permission to the device 20A with reference to the permission information included in the extension identifier $ID_A$ of the device 20A. In other words, the authentication-permission processing unit 202 of the device 20B permits a request (e.g., a request for operating data, a request for executing a function, or the like) from the device 20A depending on to the permission information. For example, in the case where only its own identifier is specified in the permission information, the authentication-permission processing unit 202 of the device 20B grants (permits) the device 20A to access itself. Also, for example, in the case where its own identifier and a permitted operation are specified in the permission information, the authentication-permission processing unit 202 of the device 20B grants (permits) the device 20A to execute an operation indicated by the permitted operation (e.g., operation of data, use of a function, or the like).

Note that the authentication-permission processing unit 202 of the device 20B may refer to the date included in the extension identifier $ID_A$, to determine whether the permission information is within the term of validity, and grants permission to the device 20A only if the date is within the term of validity. Alternatively, in the case where the permission information in the extension identifier $ID_A$ includes a prohibited operation, expiration information, and the like, the authentication-permission processing unit 202 of the device 20B may refer to these information items to grant (permit) operations other than the prohibited operation, or to determine whether the permission information is expired.

Next, at Step S203, the device 20A executes the operation granted at Step S202 described above on the device 20B via the communication unit 201 (e.g., operation of data, use of a function, or the like). In other words, according to the operation granted at Step S202 described above, the communication unit 201 of the device 20A transmits a request for operating data, a request for executing a function, or the like to the device 20B.

On the other hand, if the mutual authentication at Step S201 described above fails (i.e., if the validity of at least one of the devices 20 among the device 20A and the device 20B is not verified), at Step S204, the authentication-permission processing unit 202 of the device 20B denies access from the device 20A.

As described above, if the mutual authentication between the permission-granting device 20 and the permission-granted device 20 is successful, by referring to the permission information included in the extension identifier of the permission-granted device 20, the permission-granting device 20 can permit the permission-granted device 20 to execute a predetermined operation (e.g., operation of data, use of a function, or the like). Therefore, the permission-granting device 20 and the permission-granted device 20 are no longer required to execute communication for the permission granting (e.g., communication to a permission granting server), and thereby, the communication load can be reduced.

<<Mutual Authentication (FSU)>>

Figure 8:
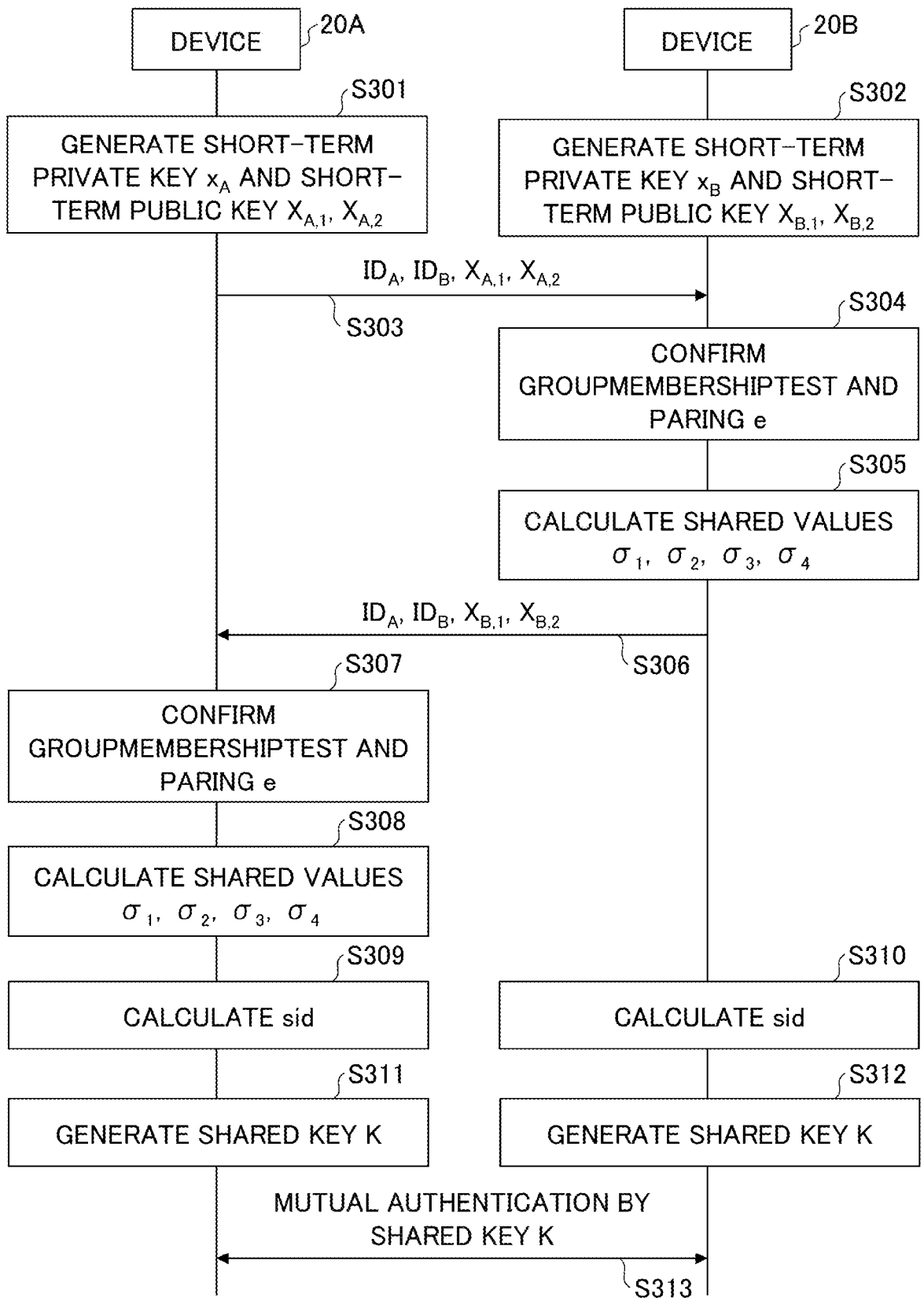
FIG. 8 is a flow chart illustrating an example of a mutual authentication process in the embodiment according to the present invention.

Next, details of the mutual authentication process at Step S201 described above will be described with reference to FIG. 8. FIG. 8 is a flow chart illustrating an example of the mutual authentication process in the embodiment according to the present invention.

Here, as described above, private keys $D_{A,1}$ and $D_{B,2}$ are generated on the authentication-permission infrastructure 10. These private keys $D_{A,1}$ and $D_{B,2}$ are generated by the registration processing unit 102 of the authentication-permission infrastructure 10 executing the following calculation:

$$D_{A,1}=zQ_{A,1}=zH_1(ID_A) \in G_1$$

$$D_{B,2}=zQ_{B,2}=zH_2(ID_B) \in G_2$$

Also, $Q_{A,1}=H_1(ID_A)$ and $Q_{B,2}=H_2(ID_B)$ are assumed to be delivered (or made public) from the authentication-permission infrastructure 10 to the device 20A and the device 20B. However, $Q_{A,1}=H_1(ID_A)$ and $Q_{B,2}=H_2(ID_B)$ may be calculated on the device 20A and the device 20B, respectively.

Note that as expressed in the calculation method of the private keys $D_{A,1}$ and $D_{B,2}$ described above, the registration processing unit 102 of the authentication-permission infrastructure 10 generates the private keys $D_{A,1}$ and $D_{B,2}$ by multiplying $Q_{A,1}$ and $Q_{B,2}$ by z, respectively. Therefore, by executing the calculation to generate private keys in parallel by using the GPU instead of the CPU, the registration processing unit 102 of the authentication-permission infrastructure 10 can efficiently generate private keys for a number of extension identifiers. Also, in this case, GPUs are generally cheaper than CPUs, and hence, the cost required for building the authentication-permission infrastructure 10 can also be reduced.

At Step S301, the authentication-permission processing unit 202 of the device 20A randomly selects a short-term private key $x_A \in Z_q$, and then, calculates a short-term public key $X_{A,1} = x_A g_1$ and a short-term public key $X_{A,2} = x_A g_2$. Accordingly, the short-term private key $x_A$ and the short-term public keys $X_{A,1}$ and $X_{A,2}$ are generated. Note that the short-term private key $x_A$ and the short-term public key $X_{A,1}$ and $X_{A,2}$ are stored, for example, in the storage unit 203 of the device 20A.

At Step S302, the authentication-permission processing unit 202 of the device 20B randomly selects a short-term private key $x_B \in Z_q$, and then, calculates a short-term public key $X_{B,1} = x_B g_1$ and a short-term public key $X_{B,2} = x_B g_2$. Accordingly, the short-term private key $x_B$ and the short-term public keys $X_{B,1}$ and $X_{B,2}$ are generated. Note that the short-term private key $x_B$ and the short-term public key $X_{B,1}$ and $X_{B,2}$ are stored, for example, in the storage unit 203 of the device 20B.

At Step S303, the communication unit 201 of the device 20A transmits the extension identifier $ID_A$, the extension identifier $ID_B$, the short-term public key $X_{A,1}$, and the short-term public key $X_{A,2}$ to the device 20B.

At Step S304, the authentication-permission processing unit 202 of the device 20B verifies whether the value of a GROUPMEMBERSHIPTEST function for an elliptic curve $E_1$ and $X_{A,2}$, and the value of the GROUPMEMBERSHIPTEST function for an elliptic curve $E_2$ and $X_{A,1}$ are both 1, and $e(X_{A,1}, g_2) = e(g_1, X_{A,2})$. Here, the GROUPMEMBERSHIPTEST function is a function that takes an elliptic curve E and a point P as arguments, and returns 1 if the point P is a point on the elliptic curve E, or 0 otherwise.

Note that if one of the values of the GROUPMEMBERSHIPTEST function is 0 or $e(X_{A,1}, g_2) \neq e(g_1, X_{A,2})$ at Step S304 described above, the mutual authentication is determined as failed, and the processing is terminated or executed again from Step S301 described above. In the following, assume that it is verified at Step S304 described above that the values of the GROUPMEMBERSHIPTEST function are both 1 and that $e(X_{A,1}, g_2) = e(g_1, X_{A,2})$.

At Step S305, the authentication-permission processing unit 202 of the device 20B calculates shared values $\sigma_1$, $\sigma_2$, $\sigma_3$, and $\sigma_4$ as follows:

$$\sigma_1 = e(Q_{A,1}, D_{B,2})$$

$$\sigma_2 = e(Q_{A,1} + X_{A,1}, D_{B,2} + x_B Z_2)$$

$$\sigma_3 = x_B X_{A,1}$$

$$\sigma_4 = x_B X_{A,2}$$

Next, at Step S306, the communication unit 201 of the device 20B transmits the extension identifier $ID_A$, the extension identifier $ID_B$, the short-term public key $X_{B,1}$, and the short-term public key $X_{B,2}$ to the device 20A.

At Step S307, the authentication-permission processing unit 202 of the device 20A verifies whether the value of the GROUPMEMBERSHIPTEST function for the elliptic curve $E_1$ and $X_{B,2}$, and the value of the GROUPMEMBERSHIPTEST function for the elliptic curve $E_2$ and $X_{B,1}$ are both 1, and $e(X_{B,1}, g_2) = e(g_1, X_{B,2})$.

Note that if one of the values of the GROUPMEMBERSHIPTEST function is 0 or $e(X_{B,1}, g_2) \neq e(g_1, X_{B,2})$ at Step S307 described above, the mutual authentication is determined as failed, and the processing is terminated or executed again from Step S301 described above. In the following, assume that it is verified at Step S307 described above that the values of the GROUPMEMBERSHIPTEST function are both 1 and that $e(X_{B,1}, g_2) = e(g_1, X_{B,2})$. At Step S308, the authentication-permission processing unit 202 of the device 20A calculates shared values $\sigma_1$, $\sigma_2$, $\sigma_3$, and $\sigma_4$ as follows:

$$\sigma_1 = e(D_{A,1}, Q_{B,2})$$

$$\sigma_2 = e(D_{A,1} + x_A Z_1, Q_{B,2} + X_{B,2})$$

$$\sigma_3 = x_A X_{B,1}$$

$$\sigma_4 = x_A X_{B,2}$$

Next, at Step S309, the authentication-permission processing unit 202 of the device 20A calculates sid as follows, where sid is a session ID.

$$sid = (ID_1 \| ID_B \| \hat{X}_{A,1} \| \hat{X}_{A,2} \| \hat{X}_{B,1} \| \hat{X}_{B,2}) \quad \text{[Formula 2]}$$

where $\hat{X}_{A,1}$: string converted from $X_{A,1}$
$\hat{X}_{A,2}$: string converted from $X_{A,2}$
$\hat{X}_{B,1}$: string converted from $X_{B,1}$
$\hat{X}_{B,2}$: string converted from $X_{B,2}$
$\|$: concatenation of strings Also, as at Step S309 described above, at Step S310, the authentication-permission processing unit 202 of the device B calculates sid as follows:

$$sid = (ID_A \| ID_B \| \hat{X}_{A,1} \| \hat{X}_{A,2} \| \hat{X}_{B,1} \| \hat{X}_{B,2}) \quad \text{[Formula 3]}$$

At Step S311, the authentication-permission processing unit 202 of the device 20A generates a shared key K as follows:

$$K = H(\sigma_1 \| \sigma_2 \| \sigma_3 \| \sigma_4 \| sid) \quad \text{[Formula 4]}$$

Note that the shared key K is stored, for example, in the storage unit 203 of the device 20A.

Also, at Step S312, the authentication-permission processing unit 202 of the device 20B generates a shared key K as follows, as at Step S311 described above.

$$K = H(\sigma_1 \| \sigma_2 \| \sigma_3 \| \sigma_4 \| sid) \quad \text{[Formula 5]}$$

Note that the shared key K is stored, for example, in the storage unit 203 of the device 20B.

Accordingly, the shared key K is shared between the device 20A and the device 20B. Then, at Step S313, the device 20A and the device 20B execute mutual authentication using the shared key K.

As described above, by using FSU, the mutual authentication can be executed between the device 20A and the device 20B. Here, focusing on $\sigma_1$ calculated by the device 20A at Step S308 described above, $\sigma_1 = e(D_{A,1}, Q_{B,2})$. Therefore, in the case where the $Q_{B,2} (= H_2(ID_B))$ as the destination to which the device 20A is connected is fixed, by calculating this $\sigma_1$ once and holding the calculation result in the storage unit 203 or the like, the calculation of $\sigma_1$ can be skipped in the next calculation. Also, $Q_{B,2}$ by itself is public information; therefore, in the case where $Q_{B,2}$ is generated based on a certain rule, $Q_{B,2}$ can be calculated in advance, and then, $\sigma_1$ can also be calculated in advance.

Accordingly, the device 20A becomes capable of efficiently executing a process required for the mutual authentication. In particular, the device 20A is an IoT device or the like that has limited hardware resources compared to a typical PC or the like; therefore, by calculating $\sigma_1$ in advance, the process required for the mutual authentication can be executed more efficiently (i.e., the processing load of the CPU can be reduced, and can be executed faster).

Modified Example of Mutual Authentication

In the following, as a modified example of the mutual authentication process at Step S201 in FIG. 7, a case of executing a mutual authentication process will be described in which an improved protocol of FSU is used so as to make the communication traffic between the devices 20 reduced more, and to make the calculation amount on each device 20 reduced more.

Definition of Symbols

First, the symbols used in the present modified example are defined as follows.
$ID_A$: the extension identifier of the device 20A
$ID_B$: the extension identifier of the device 20B
$D_A$: the private key of the device 20A
$D_B$: the private key of the device 20B
k: a security parameter
p, q: prime numbers satisfying p≠q
$G_1$: a subgroup in an elliptic curve $E_1:=E(F_p)$ on a finite field $F_p$
$G_2$: a subgroup in the following elliptic curve on the k-th extension field of $F_p$ $$E_2 := E(F_p k) \quad \text{[Formula 6]}$$

$g_1$: a generator of $G_1$
$g_2$: a generator of $G_2$
$Z_q$: cosets modulo q
$Z \in Z_q$: a master private key
$Z = zg_1 \in G_1$: a master public key
$H_1$: a function to generate elements on $Z_q$ from a string (i.e., an octet string)
$H_2$: a function to generate elements on $Z_q$ from a string
$H_3$: a function to generate elements on $Z_q$ from a string
H: a key derivation function
K: a shared key
e: a pairing operation defined on $G_1 \times G_2$ Here, among the symbols defined above, all but the master private key z, the private key $D_A$ and $D_B$ are public information. Note that $G_1$ and $G_2$ may be reversed. Also, in the case of inputting an element of a group or an element of $Z_q$ into a function, it is assumed that a string representing the element is input into the function.

Also, as described above, the private keys $D_A$ and $D_B$ are generated on the authentication-permission infrastructure 10. These private keys $D_A$ and $D_B$ are generated by the registration processing unit 102 of the authentication-permission infrastructure 10 executing the following calculation:

$$D_A = \frac{1}{z+i_A} g_2 \quad \text{[Formula 7]}$$

$$D_B = \frac{1}{z+i_B} g_2 \quad \text{[Formula 8]}$$

where $i_A = H_1(ID_A)$ and $i_B = H_1(ID_B)$. These $i_A$ and $i_B$ may be generated on the authentication-permission infrastructure 10, or may be generated on the devices 20. In other words, for example, when generating a private key $D_A$, $i_A$ may be generated on the authentication-permission infrastructure 10, or $i_A$ may be generated on the device 20A and made public to the authentication-permission infrastructure 10. Similarly, for example, when generating a private key $D_B$, $i_B$ may be generated on the authentication-permission infrastructure 10, or $i_B$ may be generated on the device 20B and made public to the authentication-permission infrastructure 10. Note that although it is convenient to generate $i_A$ and $i_B$ on the device 20A and the device 20B, respectively, for example, in the case where the calculation resources of the device 20 are limited and considerable calculation resources are required for the calculation of $H_1$, it is favorable to generate $i_A$ and $i_B$ on the authentication-permission infrastructure 10.

<<Modified Example of Mutual Authentication Process>>

Figure 9:
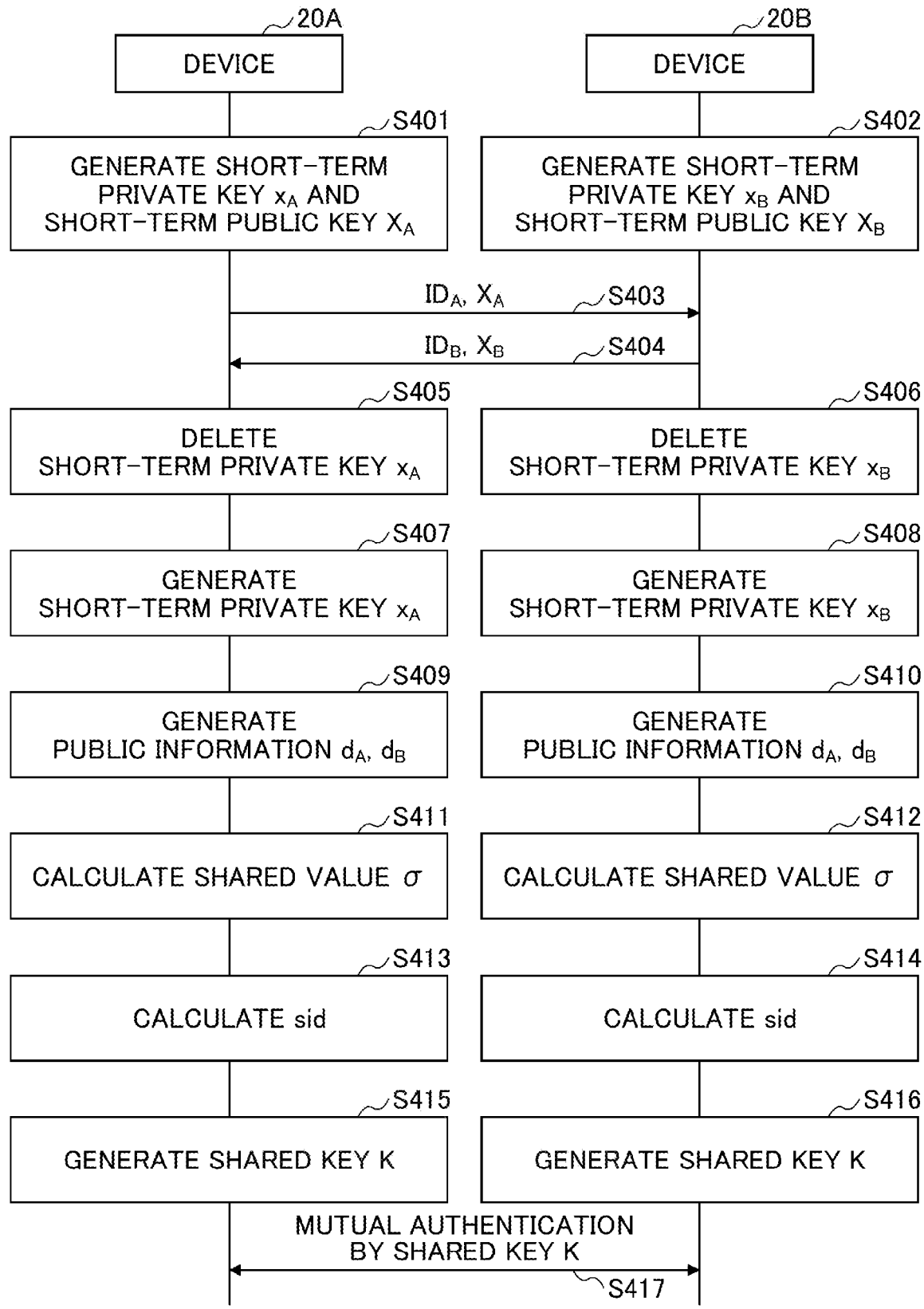
FIG. 9 is a flow chart illustrating a modified example of a mutual authentication process in the embodiment according to the present invention.

Next, a modified example of the mutual authentication process at Step S201 in FIG. 7 will be described with reference to FIG. 9. FIG. 9 is a flow chart illustrating a modified example of the mutual authentication process in the embodiment according to the present invention.

The authentication-permission processing unit 202 of the device 20A randomly selects $r_A \in Z_q$, and then, generates a short-term private key as $$x_A = H_2(D_A \| r_A) \quad \text{[Formula 9]}$$

and at Step S401, generates a short-term public key $X_A = x_A(z+i_B)g_1$. Note that the short-term private key $x_A$ and the short-term public key $X_A$ are stored, for example, in the storage unit 203 of the device 20A.

Similarly, the authentication-permission processing unit 202 of the device 20B randomly selects $r_B \in Z_q$, and then, generates a short-term private key as $$x_B = H_2(D_B \| r_B) \quad \text{[Formula 10]}$$

and at Step S402, generates a short-term public key $X_B = x_B(z+i_A)g_1$. Note that the short-term private key $x_B$ and the short-term public key $X_B$ are stored, for example, in the storage unit 203 of the device 20B.

Next, at Step S403, the communication unit 201 of the device 20A transmits the extension identifier $ID_A$ and the short-term public key $X_A$ to the device 20B. Note that at this time, the communication unit 201 of the device 20A may also transmit the extension identifier $ID_B$ to the device 20B.

Similarly, at Step S404, the communication unit 201 of the device 20B transmits the extension identifier $ID_B$ and the short-term public key $X_B$ to the device 20A. Note that at this time, the communication unit 201 of the device 20B may also transmit the extension identifier $ID_A$ to the device 20A.

Next, at Step S405, the authentication-permission processing unit 202 of the device 20A deletes the short-term private key $x_A$ generated at Step S401 described above from the storage unit 203. Similarly, at Step S406, the authentication-permission processing unit 202 of the device 20B deletes the short-term private key $x_B$ generated at Step S402 described above from the storage unit 203.

Note that the short-term private key $x_A$ and the short-term private key $x_B$ are deleted at Step S405 and Step S406 described above, respectively; this is to prevent the short-term private keys from leaking out before receiving the extension identifier and the short-term public key from the other device 20. In other words, for example, after the device 20A has transmitted the extension identifier $ID_A$ and the short-term public key $X_A$ to the device 20B, it may take some time until the device 20A receives the extension identifier $ID_B$ and the short-term public key $X_B$ from the device 20B. Therefore, in order to prevent a leak of the short-term private key $x_A$ during this time, the device 20A deletes the short-term private key $x_A$ after having transmitted the extension identifier $ID_A$ and the short-term public key $X_A$ to the device 20B. The reason why deleting the short-term private key $x_B$ is the same. However, operation without deleting the short-term private key $x_A$ and $x_B$ can also be performed (i.e., operation without executing Step S405 and Step S406, and Step S407 and Step S408 that will be described later, can also be performed).

Here, at a point of time when the extension identifier $ID_B$ and the short-term public key $X_B$ are received from the device 20B, the device 20A is ready to execute subsequent Step S405, Step S407, Step S409, Step S411, Step S413, and Step S415. Similarly, at a point of time when the extension identifier $ID_A$ and the short-term public key $X_A$ are received from the device 20A, the device 20B is ready to execute subsequent Step S406, Step S408, Step S410, Step S412, Step S414, and Step S416. The authentication-permission processing unit 202 of the device 20A generates again a short-term private key $$x_A = H_2(D_A \| r_A) \qquad \text{[Formula 11]}$$

at Step S407. Note that the short-term private key $x_A$ is stored in the storage unit 203 of the device 20A.

Similarly, the authentication-permission processing unit 202 of the device 20B generates again a short-term private key $$x_B = H_2(D_B \| r_B) \qquad \text{[Formula 12]}$$

at Step S408. Note that the short-term private key $x_B$ is stored in the storage unit 203 of the device 20B.

Next, at Step S409, the authentication-permission processing unit 202 of the device 20A generates public information $d_A$ and $d_B$ as follows:

$$d_A = H_3(X_A, ID_A, ID_B)$$

$$d_B = H_3(X_B, ID_A, ID_B)$$

Similarly, at Step S410, the authentication-permission processing unit 202 of the device 20B generates public information $d_A$ and $d_B$ as follows:

$$d_A = H_3(X_A, ID_A, ID_B)$$

$$d_B = H_3(X_B, ID_A, ID_B)$$

Here, at Step S409 and Step S410 described above, although the public information $d_A$ and $d_B$ are generated on the device 20A and on the device 20B, these may be generated on the authentication-permission infrastructure 10. Although it is convenient to generate $d_A$ and $d_B$ on the device 20A and on the device 20B, respectively, for example, in the case where the calculation resources of the device 20 are limited and considerable calculation resources are required for the calculation of $H_3$, it is favorable to generate public information $d_A$ and $d_B$ on the authentication-permission infrastructure 10. Note that the timing to generate the public information $d_A$ and $d_B$ may be any timing as long as it is after the generation of the short-term public keys $X_A$ and $X_B$ and before the generation of the shared value $\sigma$ that will be described later.

Next, at Step S411, the authentication-permission processing unit 202 of the device 20A calculates a shared value $\sigma$ as follows:

$$F_A = (x_A + d_A)(X_B + d_B(z + i_A)g_1)$$

$$\sigma = e(F_A, D_A)$$

Similarly, at Step S412, the authentication-permission processing unit 202 of the device 20B calculates a shared value $\sigma$ as follows:

$$F_B = (x_B + d_B)(X_A + d_A(z + i_B)g_1)$$

$$\sigma = e(F_B, D_B)$$

Next, at Step S413, the authentication-permission processing unit 202 of the device 20A calculates sid as follows:

$$sid = (ID_A \| ID_B \| X_A \| X_B) \qquad \text{[Formula 13]}$$

Similarly, at Step S414, the authentication-permission processing unit 202 of the device 20B calculates sid as follows:

$$sid = (ID_A \| ID_B \| X_A \| X_B) \qquad \text{[Formula 14]}$$

At Step S415, the authentication-permission processing unit 202 of the device 20A generates a shared key K as follows:

$$K = H(\sigma \| sid) \qquad \text{[Formula 15]}$$

Note that the shared key K is stored, for example, in the storage unit 203 of the device 20A.

Similarly, at Step S416, the authentication-permission processing unit 202 of the device 20B generates a shared key K as follows:

$$K = H(\sigma \| sid) \qquad \text{[Formula 16]}$$

Note that the shared key K is stored, for example, in the storage unit 203 of the device 20B.

Accordingly, the shared key K is shared between the device 20A and the device 20B. Then, at Step S417, the device 20A and the device 20B execute mutual authentication using the shared key K.

As described above, by using an improved protocol of FSU so as to make the communication traffic between the devices 20 reduced more, and to make the calculation amount on each device 20 reduced more, the mutual authentication can be executed between the device 20A and the device 20B. Here, compared to the mutual authentication process described in FIG. 8, in this modified example, the short-term public keys transmitted and received between the device 20A and the device 20B are only $X_A$ and $X_B$; therefore, the communication traffic between the device 20A and the device 20B can be reduced. Also, the number of times of pairing operations on each of the device 20A and the device 20B is once; therefore, the calculation amount on the device 20A and the device 20B can also be reduced. Therefore, even if the device 20 is an IoT device, the device 20 becomes capable of more efficiently executing a process required for the mutual authentication.

Summary

As described above, in the authentication-permission system 1 in the embodiment according to the present invention, permission granting can be executed from the permission-granting device 20 to the permission-granted device 20, after mutual authentication has been executed between the permission-granted device 20 and the permission-granting device 20, and the permission-granting device 20 refers to the extension identifier of the permission-granted device 20. Therefore, according to authentication-permission system 1 in the embodiment according to the present invention, the permission-granting device 20 and the permission-granted device 20 are no longer required to execute communication for the permission granting (e.g., communication to a permission granting server), and thereby, the communication load can be reduced.

Also, the permission information on each device 20 is included in the extension identifier; therefore, for example, the device administrator can easily control permission granting between the devices 20, by simply changing or updating the permission information included in this extension identifier.

Further, normally, although it is common to construct an authentication server and a permission granting server separately, in the authentication-permission system 1 in the embodiment according to the present invention, authentication and permission granting can be implemented only on the authentication-permission infrastructure 10. Therefore, for example, the need for interoperation between an authentication server and a permission granting server is eliminated, and the construction of a server required for authentication and permission granting becomes easier. Therefore, for example, also, in the case of constructing an environment in which a number of devices 20 are used for trials of some experimental processing, by using the authentication-permission system 1 in the embodiment according to the present invention, the environment can be easily constructed.

Note that in the embodiment described above, although the cases have been described in which the devices 20 execute authentication-permission under an assumption that one is on the granted side and the other on the granting side, it is not limited as such; for example, the granted side may be a server device or the like.

The present invention is not limited to the embodiment specifically disclosed as above, and various alterations and variations are possible without deviating from the scope of the claims.

The present application is based on a base application No. 2018-197875, filed on Oct. 19, 2018, in Japan, the entire contents of which are hereby incorporated by reference.

DESCRIPTION OF SYMBOLS 1 authentication-permission system
10 authentication-permission infrastructure
20 device
101 communication unit
102 registration processing unit
103 storage unit
201 communication unit
202 authentication-permission processing unit
203 storage unit
N communications network

The invention claimed is:

1. An authentication-permission system comprising:
a plurality of devices; and
a server configured to generate a private key for each device among the plurality of devices, and to deliver an extension identifier of said each device to said each device, wherein the extension identifier of said each device comprises an identifier to identify said each device and permission information on said each device, wherein the permission information on said each device includes permission for executing a function as requested by another device in communication with said each device,
wherein the server includes
a memory, and
a processor configured to execute:
holding the identifier of said each device and the permission information on said each device,
generating the private key for said each device from the extension identifier that includes the identifier to identify said each device and the permission information, and
delivering a pair of data including the private key and the extension identifier to said each device, and
wherein said each device among the plurality of devices includes
a memory, and
a processor configured to:
mutually authenticate with said another device of said each device by using a shared key between said each device and said another device, wherein said each device generates the shared key based on the pair of data including the private key and the extension identifier of said each device delivered from the server to said each device,
directly reference the permission information included in the extension identifier of said another device in response to the mutually authenticating with said another device, and
permit said another device a first request to said each device, in accordance with the permission information included in the extension identifier of said another device.

2. The authentication-permission system as claimed in claim 1, wherein the permission information includes information describing an operation of data for execution by said another device to be permitted by said each device according to a result of the mutually authenticate operation, and
wherein the permit operation further comprises permitting the first request for the operation of data according to the permission information.

3. The authentication-permission system as claimed in claim 1, wherein the extension identifier includes an expiration date of the permission information, and
wherein the permit operation further comprises permitting a second request from said another device to said each device in accordance with the permission information, as long as a current date or a set of a date and time is within a term of validity.

4. The authentication-permission system as claimed in claim 1, wherein the mutually authenticate operation with said another device is according to an authenticated key sharing protocol using ID-based cryptography.

5. A device that executes authentication and permission granting with another device, the device comprising:
a memory, and
a processor configured to:
mutually authenticate with another device by using a shared key between said each device and said another device, wherein said each device generates the shared key based on a pair of data including a private key and permission information on device, wherein the private key is generated by a server based on a combination of the permission information and an extension identifier that includes an identifier to identify the device, wherein the permission information on the device includes permission for executing a function as requested by said another device;

directly reference the permission information included in the extension identifier of said another device in response to the mutually authenticating with said another device; and permit said another device a request to the device in accordance with the permission information included in the extension identifier of said another device.

6. An information processing apparatus that generates respective private keys for a plurality of devices that mutually execute authentication and permission granting among each other, the information processing apparatus comprising:

a memory, and a processor configured to execute generating a private key for each device among the plurality of devices, from an extension identifier of said each device to said each device, wherein the extension identifier of said each device comprises an identifier to identify said each device and permission information on said each device, wherein the permission information on said each device includes permission for executing a function as requested by another device of said each device;

delivering a pair of data including the private key and the extension identifier to said each device; and causing said each device to directly reference the permission information included in the extension identifier of said another device in response to mutually authenticating with said another device.

7. The device according to claim 5, the device further comprising a non-transitory computer-readable recording medium having computer-readable instructions stored thereon, which when executed, causes the device to function as claimed in claim 5.

8. An authentication-permission method comprising:

holding, by a server, an identifier of each device of a plurality of devices and permission information on said each device, wherein the server and the plurality of devices are part of an authentication-permission system, and the permission information on said each device includes permission for executing a function as requested by another device in communication with said each device;

generating, by the server, the private key of said each device from the extension identifier that includes the identifier to identify said each device and the permission information on said each device;

delivering, by the server, the pair of data including the private key and the extension identifier to said each device;

mutually authenticating, by said each device with another device of the plurality of devices, by using a shared key between said each device and said another device, wherein said each device generates the shared key based on the pair of data including the private key and extension identifier of said each device delivered from the server to said each device, directly referencing the permission information included in the extension identifier of said another device in response to the mutually authenticating with said another device, and permitting, by said each device, said another device to execute the function as requested in a request to said each device, in accordance with the permission information included in the extension identifier of said another device.

9. The information processing apparatus according to claim 6, the information processing apparatus further comprising a non-transitory computer-readable recording medium having computer-readable instructions stored thereon, which when executed, causes the information processing apparatus to function as claimed in claim 6.

* * * * *